Patented Dec. 2, 1924.

1,517,709

UNITED STATES PATENT OFFICE.

RENÉ CLAVEL, OF BASEL, SWITZERLAND.

TREATMENT OF UNION OR MIXED FABRICS.

No Drawing. Application filed January 4, 1922. Serial No. 526,991.

*To all whom it may concern:*

Be it known that I, RENÉ CLAVEL, a citizen of the Swiss Republic, of Basel-Augre, Switzerland, have invented certain new and useful Improvements in or Relating to the Treatment of Union or Mixed Fabrics, of which the following is a specification.

This invention relates to the dyeing of woven or knitted union or mixed fabrics consisting partly of cellulose acetate silk threads or filaments and partly of cotton, linen, artificial silk of the cellulose type, wool or other threads or fibres or filaments, natural or artificial.

In the complete specification filed on my British patent applications 1911 of 1921 and 22980 of 1921 and in my U. S. Patent No. 1,448,432, I have described a process for dyeing cellulose acetates in artificial silk, film or other form, which is based on the discovery that certain groups of dyestuffs in general, namely hydroxyl groups, amino groups, imino groups, imide groups, nitro groups, nitroso groups (—N=O), isonitroso groups (=N·OH), acidylamino groups (H—N—CO·R, in which R stands for alkyl or aryl), and the azo groups (—N=N—), are active in the sense that they enable the dyestuff to enter into chemical reaction or combination with the cellulose acetate, and that such dyestuffs, whether of the direct, acid, basic, vat or other class, and whether soluble or insoluble in water, will dye cellulose acetate silk or other cellulose acetate products direct, in aqueous solution or suspension, if such active group or groups as before mentioned are present and no sulpho group is present in the dyestuff, or if only one sulpho group is present in the compound together with two or more of such active groups, so that the active groups are numerically preponderant relatively to the sulpho group, it having been found that the presence of more than one sulpho group in the dyestuff weakens or arrests the power of combination of the active groups with the cellulose acetate and therefore the dyeing power of the dyestuff.

Accordingly the process of my said previous specifications is characterized in that for the direct dyeing of acetyl cellulose in aqueous solution or suspension, soluble or insoluble dyestuffs are employed in the chemical constitution of which one or more of the said active groups are present, said dyestuffs either containing no sulpho group or containing only one sulpho group numerically preponderated by active groups. Said dyestuffs are hereinafter in the claims referred to as dyestuffs having direct affinity for cellulose acetate and containing at least one active group capable of dyeing the cellulose acetate direct.

The dyestuffs of the active character indicated may belong to any of the classes, direct dyes, acid dyes, basic dyes, dyes of the indigo group, vat dyes, natural organic dyes, or any other dyes having the active character referred to.

As some instances of such dyestuffs the following may for example be given:—

*Monoazo dyestuffs.*

Fat soluble orange (dyestuff from aniline and beta naphthol).
Alizarin yellow R (from paranitraniline and salicyclic acid).
Silk ponceau G (K).
Brilliant orange G (M).

*Disazo dyestuffs.*

Pyramidol brown BG.

*Triphenyl methane dyestuffs.*

Fuchsin (DH).
Chrome violet (G).

*Phthalein dyestuffs.*

Rhodamine G.

*Azine.*

Anilin black.

*Oxazine and thiazine dyestuffs.*

Gallocyanine (DH).
Methylene blue B.
Brilliant alizarine blue G.

*Indulins.*

Indulin (water-insoluble).

*Oxyketones.*

Alizarin.
Alizarin orange.
Alizarin Bordeaux paste.

*Vat dyestuffs of the anthracene series.*

Indanthrene X.
Indanthrene Bordeaux B.
Algol rosa R.
Algol scarlet G.
Algol yellow W G.
Algol violet B.

*Vat dyestuffs of the indigo groups.*

*Natural organic dyestuffs.*

Cochinille.
Logwood (Haematin).
Catechu.

The said previous invention further comprises, the employment in conjunction with dyestuffs having the active character referred to, and especially with non-sulphonated or mono sulphonated basic dyestuffs having the active character, of salts which are capable of forming a double salt or complex with basic dyestuffs, such for example as magnesium chloride, stannous chloride, zinc chloride or the like. In the case of basic dyes these may of course be employed in the form of their previously prepared double salts with such salts as referred to.

According to the present invention, for the dyeing of union or mixed fabrics consisting partly of cellulose acetate and partly of cotton, linen, wool, cellulose-silk or other threads, filaments or fibres, I dye the fabric with a direct, mordant, acid or other dyestuff or dyestuffs appropriate for the cotton, linen, wool or other non-acetate portion of the fabric and non-active or insufficiently active for the cellulose acetate, and I dye the cellulose acetate portion of the fabric with a dyestuff or dyestuffs of the active character referred to. Or according to the invention I may dye both the cellulose acetate portion and the non-acetate portion with a dyestuff or dyestuffs suitable for dyeing the non-acetate portion and having the active character which renders them capable of dyeing the acetate portion.

Where different dyestuffs are used for dyeing the acetate and non-acetate portions of the fabric, their colours or shades may be matched or appropriate to each other, so as to obtain solid or uniform shades on the union or mixed fabric or dyestuffs of different colours or shades may be employed to obtain differences of colour or shade between the cellulose acetate portion and the non-acetate portion respectively.

Separate dyebaths may be employed for the dyeing of the respective portions of the fabric, or a single dyebath may be used containing both a dyestuff or dyestuffs suitable for the non-acetate portion and a dyestuff or dyestuffs of the active character for the cellulose acetate portion; or a single bath may be employed containing a dyestuff or dyestuffs of the active character and which is also suitable for the non-acetate portion of the fabric.

When separate dyebaths are used for the different portions, the order of dyeing the respective portions may vary either the non-acetate portion or the acetate portion being dyed first, the material being preferably washed between the respective dyeings.

The dyed fabric may with advantage be treated with a bath containing an organic acid such as formic or acetic acid and oil emulsion such for example as one consisting of olive and olive oil soap.

By way of illustration I may first dye the union or mixed fabric in any known or suitable way with a direct, mordant, acid or other dyestuff or dyestuffs appropriate for the cotton, linen, cellulose-silk, wool or other threads, filaments or fibres of the fabric, and which do not possess the said active character at all or sufficiently for dyeing or adequate dyeing of the cellulose acetate, and I may then dye the fabric, or the cellulose acetate portion thereof, with a selected dyestuff or dyestuffs of the active character, of a colour or shade matched or appropriate to that of the dyestuff or dyestuffs used for dyeing the cotton or other portion of the fabric, the dyeing with the active dye or dyes being carried to the necessary point to attain solid or uniform shades on the union or mixed fabric, or it may be any desired difference of relative shade between the cellulose acetate portion and the other portion of the fabric.

For instance, a union fabric consisting partly of cotton and partly of cellulose acetate silk may be first dyed up with a sulphonated or mordant dyestuff such as commonly employed in the dyeing of cotton, and then, preferably after washing, be dyed in a bath of a selected dyestuff of the active character before referred to, approximating in colour or tone to that of the cotton dye, the dyeing being continued in the second bath till a solid shade has been obtained on the union fabric.

Instead of dyeing first with the dyestuff inctive or insufficiently active to cellulose acetate and afterwards with the dye active thereto, this procedure may be reversed. Or both classes of dyestuff may be used in a single bath for dyeing the cellulose acetate and non-acetate portions in one bath. Or a dyestuff or dyestuffs of the active character may be used for dyeing both the acetate portion and the non-acetate portion of the fabric in one operation or separately.

In any case, the dyeing of the cellulose acetate portion of the fabric, whether in a separate bath or in a single bath with the other portion, may be effected with salts such for example as magnesium chloride, stannous chloride, zinc chloride or the like, which are capable of forming double salts with basic dyestuffs. Such salts may especially be used where non-sulphonated or monosulphonated basic dyestuffs of the active character are employed for dyeing the cellulose acetate.

The following are some examples of the manner in which the invention may be carried out, it being understood that these are given solely by way of illustration and can be varied widely without departing from the invention.

*Example 1.*

A dye bath of a sulphonated cotton dye, e. g. a benzidine dyestuff, is prepared, containing a usual salt such as sodium sulphate, and a union fabric of cotton and cellulose acetate silk is worked in this until the cotton has been dyed sufficiently. The fabric is then washed and is transferred to an aqueous dyebath containing induline in suspension in presence of acetic acid, and is treated in this bath at about 60–70° C. until the cellulose acetate is dyed to the same shade as the cotton, or to a desired different shade. The dyed fabric may then be washed in a bath containing acetic or formic acid and oil emulsion consisting of olive oil and olive oil soap, at about 15°–35° C.

*Example 2.*

A union fabric of cotton and cellulose acetate is dyed in a way similar to Example 1, except that the order of the baths is reversed, the fabric being first treated in the induline bath and then, after washing, in the bath of the cotton dye.

*Example 3.*

A union fabric of mercerized cotton, or mordanted cotton and cellulose acetate silk is treated in a single aqueous dyebath of a basic dyestuff possessing the active character before referred to, e. g. fuchsin, at a temperature of about 60°–70° C. until a desired depth of shade is obtained on the whole fabric. The dyed fabric can then be washed in a bath of acetic or formic acid and oil emulsion consisting of olive oil and olive oil soap, at about 15°–35° C.

In any of these examples a salt of the kind capable of forming a double salt with basic dyestuffs may be employed. For example magnesium chloride may be added in a porportion of say about 300 grams per litre to any of the baths in which the acetate portion is dyed separately or together with the other portion.

The dyeing may in any case be performed in a foam bath or in a non-foam bath.

In carrying out the invention any of the particular dyestuffs of active character mentioned in my said British and U. S. specifications may be employed for dyeing the cellulose acetate of the mixed or union fabrics.

It is understood, as hereinbefore indicated, that instead of only one of the active dyestuffs capable of dyeing the cellulose acetate direct, more than one such dyestuff may be employed in performing the invention, and also that more than one dye appropriate for the non-acetate portion of the mixed goods may be employed; likewise that a plurality of soluble metallic salts capable of forming double salts with basic dyestuffs may be employed. The claiming clauses are to be read in the generic sense accordingly.

What I claim and desire to secure by Letters Patent is:

1. In a process for dyeing union or mixed fabrics containing cellulose acetate threads or filaments, subjecting the mixed fabric to dyeing treatment with a dyestuff having direct affinity for cellulose acetate, said dyestuff containing at least one active group capable of dyeing the cellulose acetate direct.

2. In a process for dyeing union or mixed fabrics containing cellulose acetate threads or filaments, subjecting the mixed fabric to dyeing treatment with a dyestuff appropriate for the non-acetate portion and with a dyestuff having direct affinity for cellulose acetate, said latter dyestuff containing at least one active group capable of dyeing the cellulose acetate direct.

3. In a process for dyeing union or mixed fabrics containing cellulose acetate threads or filaments, subjecting the mixed fabric to dyeing treatment with a dyestuff appropriate for the non-acetate portion and not capable of dyeing the cellulose acetate direct, and with a dyestuff having direct affinity for cellulose acetate, said latter dyestuff containing at least one active group capable of dyeing the cellulose acetate direct.

4. In a process for dyeing union or mixed fabrics containing cellulose acetate threads or filaments, subjecting the mixed fabric to dyeing treatment with a dye appropriate for the non-acetate portion and to dyeing treatment with a dyestuff having direct affinity for cellulose acetate, said latter dyestuff containing at least one active group capable of dyeing the cellulose acetate direct, said dyeing treatments being applied separately to the mixed fabric.

5. In a process for dyeing union or mixed fabrics containing cellulose acetate threads or filaments, subjecting the mixed fabric to dyeing treatment with a dye appropriate for the non-acetate portion and to dyeing treatment with a dyestuff having direct affinity for cellulose acetate, said latter dyestuff containing at least one active group capable of dyeing the cellulose acetate direct, said dyeing treatments being applied separately to the mixed fabric, and the fabric being washed between the dyeing treatments.

6. In a process for dyeing union or mixed fabrics containing cellulose acetate threads or filaments, subjecting the mixed fabric to dyeing treatment with a dye appropriate to the non-acetate portion and thereafter subjecting the mixed fabric to dyeing treatment with a dyestuff having direct affinity for cellulose acetate, said latter dyestuff containing at least one active group capable of dyeing the cellulose acetate direct.

7. In a process for dyeing union or mixed fabrics containing cellulose acetate threads or filaments, subjecting the mixed fabric to dyeing treatment with a dye appropriate for the non-acetate portion and not capable of dyeing the cellulose acetate direct, and to dyeing treatment with a dyestuff having direct affinity for cellulose acetate, said latter dyestuff containing at least one active group capable of dyeing the cellulose acetate direct, said dyeing treatments being applied separately to the mixed fabric.

8. In a process for dyeing union or mixed fabrics containing cellulose acetate threads or filaments, subjecting the mixed fabric to dyeing treatment with a dye appropriate for the non-acetate portion and not capable of dyeing the cellulose acetate direct, and to dyeing treatment with a dyestuff having direct affinity for cellulose acetate, said latter dyestuff containing at least one active group capable of dyeing the cellulose acetate direct, said dyeing treatments being applied separately to the mixed fabric, and the fabric being washed between said dyeing treatments.

9. In a process for dyeing union or mixed fabrics containing cellulose acetate threads or filaments, subjecting the mixed fabric to dyeing treatment in an aqueous dyebath comprising a dyestuff having direct affinity for cellulose acetate, said dyestuff containing at least one active group capable of dyeing the cellulose acetate direct, said aqueous dyebath further comprising a soluble metallic salt of the class which is capable of forming double salts with basic dyestuffs.

10. In a process for dyeing union or mixed fabrics containing cellulose acetate threads or filaments, subjecting the mixed fabric to dyeing treatment in an aqueous dyebath comprising a dyestuff having direct affinity for cellulose acetate, said dyestuff containing at least one active group capable of dyeing the cellulose acetate direct, said aqueous dyebath further comprising a soluble metallic chloride capable of forming a double salt with basic dyestuffs.

11. In a process for dyeing union or mixed fabrics containing cellulose acetate threads or filaments, subjecting the mixed fabric to dyeing treatment in an aqueous dyebath comprising a basic dyestuff having direct affinity for cellulose acetate, said dyestuff containing at least one active group capable of dyeing the cellulose acetate direct, said aqueous dyebath further comprising a soluble metallic salt capable of forming a double salt with basic dyestuffs.

In testimony whereof I have hereunto subscribed my name.

Dr. RENÉ CLAVEL.